(12) United States Patent
Ishii et al.

(10) Patent No.: US 6,170,260 B1
(45) Date of Patent: Jan. 9, 2001

(54) EXHAUST EMISSION CONTROL APPARATUS FOR COMBUSTION ENGINE

(75) Inventors: Hitoshi Ishii; Kimiyoshi Nishizawa, both of Kanagawa-ken (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/151,279

(22) Filed: Sep. 11, 1998

(30) Foreign Application Priority Data

Sep. 11, 1997 (JP) .................................................. 9-246408

(51) Int. Cl.[7] ........................................................ F01N 3/00
(52) U.S. Cl. ............................... 60/297; 60/285; 60/284; 60/295
(58) Field of Search .............................. 60/297, 285, 284, 60/295, 301, 299; 422/171, 177, 169; 123/406.44, 406.52, 406.55, 683, 680

(56) References Cited

U.S. PATENT DOCUMENTS

| | | | |
|---|---|---|---|
| 5,315,824 | * | 5/1994 | Takeshima et al. ............ 60/297 |
| 5,501,073 | * | 3/1996 | Miyashita et al. ............. 60/284 |
| 5,538,697 | * | 7/1996 | Abe et al. ..................... 422/171 |
| 5,551,231 | * | 9/1996 | Tanaka et al. ................. 60/289 |
| 5,713,198 | * | 2/1998 | Aoki et al. .................... 60/277 |
| 5,804,148 | * | 9/1998 | Kanesaka et al. ............ 422/174 |
| 5,979,157 | * | 11/1999 | Kinugasa et al. .............. 60/274 |

FOREIGN PATENT DOCUMENTS 5-10178    1/1993  (JP) .

* cited by examiner

Primary Examiner—Thomas Denion
Assistant Examiner—Binh Tran
(74) Attorney, Agent, or Firm—Foley & Lardner

(57) ABSTRACT

Exhaust gas due to combustion is discharged into the atmosphere through a combined catalytic-hydrocarbon adsorbent 20. The combined catalytic-hydrocarbon adsorbent consists of a hydrocarbon adsorbent layer 20A and a three-way catalytic layer 20B. The hydrocarbon adsorbent layer 20A adsorbs hydrocarbons at a lower temperature, and desorbs hydrocarbons at a higher temperature. The three-way catalytic layer 20B purifies hydrocarbons desorbed from the hydrocarbon adsorbent layer 20A. To reduce the amount of hydrocarbons discharged to atmosphere, when the running condition of the engine is in the idling region, the ignition timing is retarded. This retarding of the ignition timing is limited to the time period after the hydrocarbon adsorbent layer 20A begins desorbing hydrocarbons until three-way catalytic layer 20B activates. With this design, the temperature of the combined catalyst-hydrocarbon adsorbent rises rapidly and the amount of hydrocarbon emission is controlled to be minimum.

13 Claims, 10 Drawing Sheets

EXHAUST EMISSION CONTROL APPARATUS FOR COMBUSTION ENGINE

CROSS REFERENCE TO RELATED APPLICATIONS

The entire contents of Japanese application Tokugan Hei 9-246408, with a filing date of Sep. 11, 1997 in Japan, is hereby incorporated by reference.

BACKGROUND OF THE INVENTION

This invention relates to an exhaust emission control apparatus for a combustion engine, including a hydrocarbon adsorbent for adsorbing hydrocarbons at a lower temperature, and a catalytic converter being activated at a higher temperature.

In Japanese Patent Application Laid-open No.10178/93, a hydrocarbon adsorbent and a three-way catalytic converter are disposed in series from an upstream side in an exhaust pipe connected to a combustion engine. This hydrocarbon adsorbent adsorbs hydrocarbons in the exhaust gas at a lower temperature such as the start-up period of the engine, and desorbs it at a higher temperature. The three-way catalytic converter disposed downstream of the hydrocarbon adsorbent purifies hydrocarbons desorbed from the hydrocarbon adsorbent.

During the start-up period of the engine at a lower temperature, fuel is not effectively mixed with intake air. Therefore, to warm up the engine, the air fuel mixture is controlled to be rich relative to stoichiometric.

Then the temperature of the engine rises, the hydrocarbon adsorbent begins desorbing hydrocarbons. At this time, the air fuel mixture is controlled to be lean relative to stoichiometric so that the air fuel mixture entering the catalytic converter does not get too rich. Therefore, even if the hydrocarbon adsorbent desorbs hydrocarbons, the three-way catalytic converter performs oxidation of hydrocarbons (HC) and carbon monoxide (CO), and reduction of nitrogen oxides (NOx).

After desorbing hydrocarbons from the hydrocarbon adsorbent, the air fuel mixture is controlled to be stoichiometric.

According to this disclosure, during the start-up period of the engine at a lower temperature, the engine may maintain steady state by controlling the air fuel mixture to be rich.

However, as the inventors of the present invention have discovered, even if the air fuel mixture is controlled to be rich, a sufficient rise of the exhaust gas temperature is not obtained, and activation of the three-way catalytic converter is not expected. Therefore, it is necessary to install a second air supply device separately so that the exhaust temperature may be raised. This increases cost.

On the other hand, when the hydrocarbon adsorbent desorbs hydrocarbon, the air fuel mixture is controlled to be lean relative to stoichiometric. Therefore, the rapid rise of the exhaust gas temperature is not obtained in this period, and early activation of the three-way catalytic converter is not expected either.

Generally, the desorbing temperature of the hydrocarbon adsorbent is lower than the activation temperature of the three-way catalytic converter.

Therefore, the period after reaching the desorbing temperature of the hydrocarbon adsorbent until reaching the activation temperature of the three-way catalytic converter becomes a matter of concern. In this period, the three-way catalytic converter might not purify the hydrocarbon desorbed from the hydrocarbon adsorbent. In other words, the amount of hydrocarbons discharged to atmosphere might increase until the three-way catalytic converter activates.

BRIEF SUMMARY OF THE INVENTION

It is therefore an object of this invention to provide an exhaust emission control system for a combustion engine having a new method of operation, which can decrease hydrocarbons discharged to atmosphere from the start of the engine to the activation of the catalytic converter.

In order to achieve the above object, this invention provides an exhaust emission control apparatus for a combustion engine, comprising a hydrocarbon adsorbent for adsorbing hydrocarbons at a lower temperature, and desorbing hydrocarbons at a higher temperature, disposed in an exhaust passage of an engine, a catalytic converter for purifying hydrocarbons desorbed from the hydrocarbon adsorbent, disposed in the exhaust passage of the engine, a sensor to detect an engine low load region, and an exhaust temperature control device to raise exhaust temperature when the adsorbent begins to desorb hydrocarbons in a low load region.

It is preferable that the exhaust temperature control device to raise exhaust temperature when the adsorbent begins to desorb hydrocarbons in an idling region.

The invention also provides an exhaust emission control apparatus for a combustion engine, comprising a hydrocarbon adsorbent for adsorbing hydrocarbons at a lower temperature, and desorbing hydrocarbons at a higher temperature, disposed in an exhaust passage of an engine, a catalytic converter for purifying hydrocarbons desorbed from the hydrocarbon adsorbent, disposed in the exhaust passage of the engine, a sensor to detect an engine low load region, a processor to determine whether or not the adsorbent desorbs hydrocarbons, and an exhaust temperature control device to raise an exhaust temperature when the adsorbent desorbs hydrocarbons in a low load region.

It is preferable that the processor determines whether or not the adsorbent begins desorbing hydrocarbons based on an adsorbent temperature. Alternatively, the processor can presume the adsorbent temperature based on a fuel injection amount and/or intake air amount.

It is also preferable that the exhaust temperature control device raises exhaust temperature when the adsorbent desorbs hydrocarbons before the catalytic converter has activated in the low load region.

It is also preferable that the processor presumes whether or not the hydrocarbon adsorbent has finished desorbing hydrocarbons, and the exhaust temperature control device raises exhaust temperature when the hydrocarbon adsorbent begins desorbing hydrocarbons until the hydrocarbon adsorbent finishes desorbing hydrocarbons.

It is also preferable that the processor determines whether or not the catalytic converter has activated based on a temperature of engine coolant.

In one embodiment, the exhaust temperature control device retards ignition timing of the engine.

In another embodiment, the exhaust temperature control device increases engine rotation.

It is also preferable that the exhaust temperature control device retards ignition timing of the engine corresponding to a temperature of engine coolant.

It is further preferable that an intake air control valve for making a flow in a combustion chamber be closed, when the ignition timing is retarded.

In one embodiment, the hydrocarbon adsorbent and the catalytic converter are combined as a combined catalytic-hydrocarbon adsorbent.

In another embodiment, the catalytic converter be disposed downstream of the hydrocarbon adsorbent.

The invention also provides an exhaust emission control apparatus for a combustion engine, comprising, means for adsorbing hydrocarbons at a lower temperature, and desorbing hydrocarbons at a higher temperature, disposed in an exhaust passage of an engine, means for purifying hydrocarbons desorbed from the hydrocarbon adsorbent, disposed in the exhaust passage of the engine, means for detecting an low engine load region, and means for raising an exhaust temperature when the adsorbent begins to desorb hydrocarbons in a low load region.

These and other objects and many of the attendant advantages of this invention will be readily appreciated as the same become better understood by reference to the following detailed description when considered in connection with the accompanying drawing.

DETAILED DESCRIPTION OF THE PREFERRED EMBODIMENTS

The present invention will now be described by way of preferred embodiments in connection with the accompanying drawings.

Figure 1:
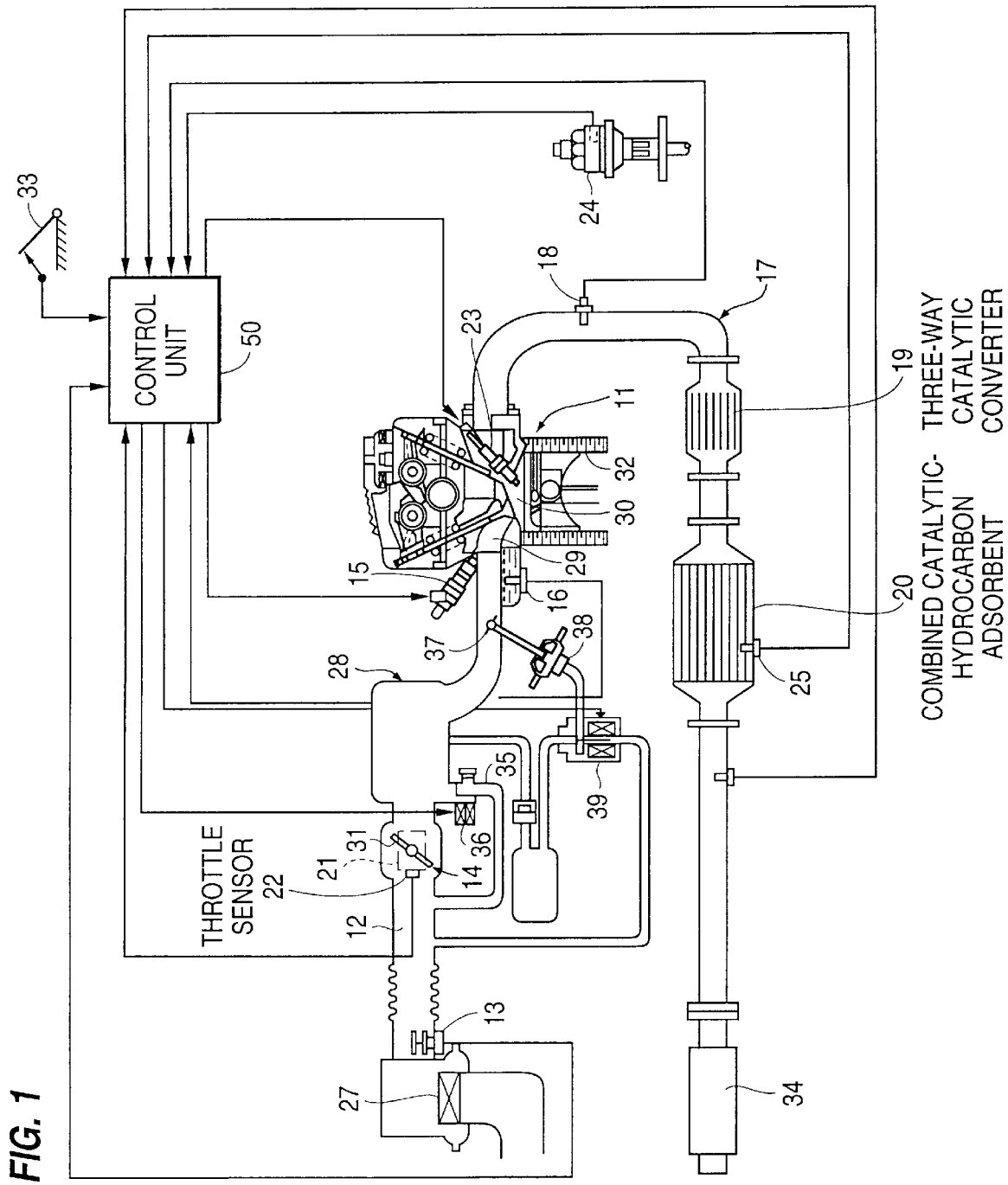
FIG. 1 is a schematic diagram of an exhaust emission control apparatus of a preferred embodiment of this invention.

FIG. 1 illustrates an exhaust emission control apparatus of a multi-cylinder internal combustion engine for a vehicle.

Referring to FIG. 1, intake air passes from an air cleaner 27 through an intake passage 12, an intake manifold 28 and an intake port 29 to a cylinder 32 of an engine 11. An air flow meter 13 is provided to measure an intake amount in the intake passage 12.

A throttle device 14 is provided to adjust an intake amount in the intake passage 12 on the downstream side of the air flow meter 13. The throttle device 14 includes a throttle valve 31, actuator 21, and throttle sensor 22. The actuator 21 such as a DC motor controls the opening degree of the throttle valve 31. To perform the throttle opening control, a throttle valve-opening signal from the throttle sensor 22 is input to a control unit 50. The throttle sensor 22 also functions as an idling switch, which detects the idling region of the engine 11.

To achieve the demanded torque calculated based on an amount of the operation of an accelerator pedal 33, the throttle device 14 is driven according to a driving signal from the control unit 50.

According to this embodiment, the throttle device 14 is fully driven according to the driving signal from the control unit 50. This invention can however be applied as follows. It is possible to link the throttle device 14 with the accelerator pedal 33 mechanically, and to control the throttle device 14 independently from the accelerator operation in the idling region or the low load region.

A supplementary air passage 35 having a supplementary air valve 36 is installed that bypasses the throttle valve 31. The supplementary air valve 36 is provided to adjust an amount of supplementary air according to a driving signal from the control unit 50.

A swirl control valve 37 (intake air control valve) controlled by a negative pressure diaphragm 38 is installed in the intake manifold 28. The swirl control valve 37 is provided to make a swirl flow in the cylinder 32, and is driven according to a driving signal from the control unit 50. When the generation of swirl is necessary such as for a lean burn running condition, the control unit 50 outputs the driving signal to an electromagnetic valve 39 so that the swirl control valve 37 closes. Instead of the swirl control valve 37, a tumble control valve which makes a tumble flow in the cylinder 32 can be applied.

The control unit 50 (microprocessor) includes a Central Processing Unit, a Read Only Memory, a Random Access Memory, an A/D converter, and an input-output interface. The control unit 50 receives input signals from various sensors, and outputs various signals to perform fuel control and ignition timing control besides throttle control.

A spark plug 23 is installed in each combustion chamber. An ignition provided by the spark plug 23 is controlled via an ignition timing signal which the control unit 50 outputs. The control unit 50 calculates the ignition timing based on the fuel supply amount, the engine rotation speed, and other factors.

Fuel is supplied to a fuel injector 15 with a fuel pump, and is adjusted to a predetermined pressure with a pressure regulator. The fuel injector 15 injects fuel into the intake air flowing through the intake port 29 of each cylinder. Injected fuel from the fuel injector 15 is mixed with intake air so as to form an air-fuel mixture, and the engine 11 rotates by burning the air-fuel mixture.

According to this embodiment, the fuel injector 15 is disposed in the intake port 29. The injectors can however be disposed in each combustion chamber 30, and supply fuel directly into the combustion chamber. Supplying fuel directly with the injector disposed in the combustion chamber is well known.

Exhaust gas due to combustion is discharged into the atmosphere through a three-way catalytic converter 19, a combined catalytic-hydrocarbon adsorbent 20, and a silencer 34 via an exhaust passage 17. The three-way catalytic converter 19 and the combined catalytic-hydrocarbon adsorbent 20 will be explained in detail later.

The injection amount from injector 15 is controlled via an injection signal output by the control unit 50 so that the air fuel ratio of the air fuel mixture in the cylinder 32 coincides with the target air fuel ratio. To perform this air fuel ratio control, a REF signal and a POS signal from a crank angle sensor 24 built into a distributor are input to the control unit 50. In a four-cylinder engine the REF signal is output at every 180° of rotation of the engine, and in a six-cylinder engine it is output at every 120° of rotation of the engine. The POS signal is output at every 1 degree of rotation of the engine.

Further inputs to the control unit 50 include an intake air amount signal from the air flow meter 13, an air fuel ratio signal from an O2 sensor 18 installed upstream of the three-way catalytic converter 19, an engine cooling water (engine coolant) temperature signal from a water temperature sensor 16, and a throttle opening signal from the throttle sensor 22.

The O2 sensor 18 is a sensor that detects whether the air fuel ratio of the air fuel mixture supplied to the combustion chamber 30 is rich or lean relative to the stoichiometric air fuel ratio from the oxygen concentration of the exhaust gas.

The control unit 50 calculates a basic injection pulse width Tp [msec] by the following equation (1) from the intake air flow rate Qa [g/sec] obtained from the output of the air flow meter 13, and the engine rotation speed Ne [rpm] obtained from the crank angle sensor 24.

$$Tp = Qa/Ne \cdot K \tag{1}$$

where,
K=Constant.

The injection pulse width Te [msec] output to the fuel injector 15 is found by the next expression (2).

$$Te = Tp \cdot Tfbya \cdot ALPHA + Ts \tag{2}$$

where,
Tfbya=target fuel air ratio equivalent amount [absolute number],
ALPHA=air fuel ratio feedback correction coefficient [%],
Ts=Ineffectual pulse width [insec].

The target fuel air ratio equivalent amount Tfbya is the sum of a water temperature increase correction coefficient Kw, post-startup increase correction coefficient Kas, and target fuel air ratio Dml. Under conditions wherein air fuel ratio feedback control is performed, Kw=0, Kas=0, Dml=0 (in other words Tfbya=1.0).

When the engine rotation is unstable on a cold start-up, Kw and Kas take values greater than 0 (i.e. Tfbya has a value greater than 1.0), and the fuel amount is increased.

When lean running conditions occur after warming up is completed, or when the combined catalytic-hydrocarbon adsorbent 20 desorbs hydrocarbons, Dml has a value of less than one, fuel is reduced, and the engine 11 runs on a lean air fuel ratio.

The air fuel ratio feedback correction coefficient ALPHA take a value based on the output of the O2 sensor 18 by proportional integral control (PI control).

When immediately after the air fuel ratio has inverted from rich to lean, the air fuel ratio feedback correction coefficient ALPHA is calculated by the following equation (3).

$$ALPHA = ALPHA(\text{old}) + PL \tag{3}$$

where,
ALPHA(old)=immediately preceding value of ALPHA,
PL=proportional part when air fuel ratio is corrected to rich by PI control.

When the air fuel ratio has not inverted, in other words, the lean air fuel ratio persists, the air fuel ratio feedback correction coefficient ALPHA is calculated by adding IL to the immediately preceding value ALPHA(old) by the following equation (4).

$$ALPHA = ALPHA(\text{old}) + IL \tag{4}$$

where,
IL=an integral part when the air fuel is corrected to rich by PI control.

On the other hand, when immediately after the air fuel ratio has inverted from lean to rich, the air fuel ratio feedback correction coefficient ALPHA is calculated by the following equation (5).

$$ALPHA = ALPHA(\text{old}) - PR \tag{5}$$

where,
ALPHA(old)=immediately preceding value of ALPHA,
PR=proportional part when air fuel ratio is corrected to lean by PI control.

When the air fuel ratio has not inverted, in other words, the rich air fuel ratio persists, the air fuel ratio feedback correction coefficient ALPHA is calculated by deducting IR from the immediately preceding value ALPHA(old) by the following equation (6).

$$ALPHA = ALPHA(\text{old}) - IR \tag{6}$$

where,
IR=an integral part when the air fuel is corrected to lean by PI control.

The air fuel ratio feedback control applies to sequential mode synchronous injection wherein injection is performed in sequence in every cylinder in synchronism with the REF signal.

The three-way catalytic converter 19 for light off catalytic conversion preferably includes palladium, which activates at a predetermined temperature. The three-way catalytic converter 19 performs oxidation of hydrocarbons (HC) and carbon monoxide (CO), and reduction of nitrogen oxides (NOx) at the same time at the stoichiometric air fuel ratio.

The combined catalytic-hydrocarbon adsorbent 20 and a temperature sensor 25 for detecting an adsorbent temperature Tc at the combined catalyst-hydrocarbon adsorbent 20 are mounted downstream of the three-way catalytic converter 19. An adsorbent temperature signal from the temperature sensor 25 is input to the control unit 50.

Figure 2:
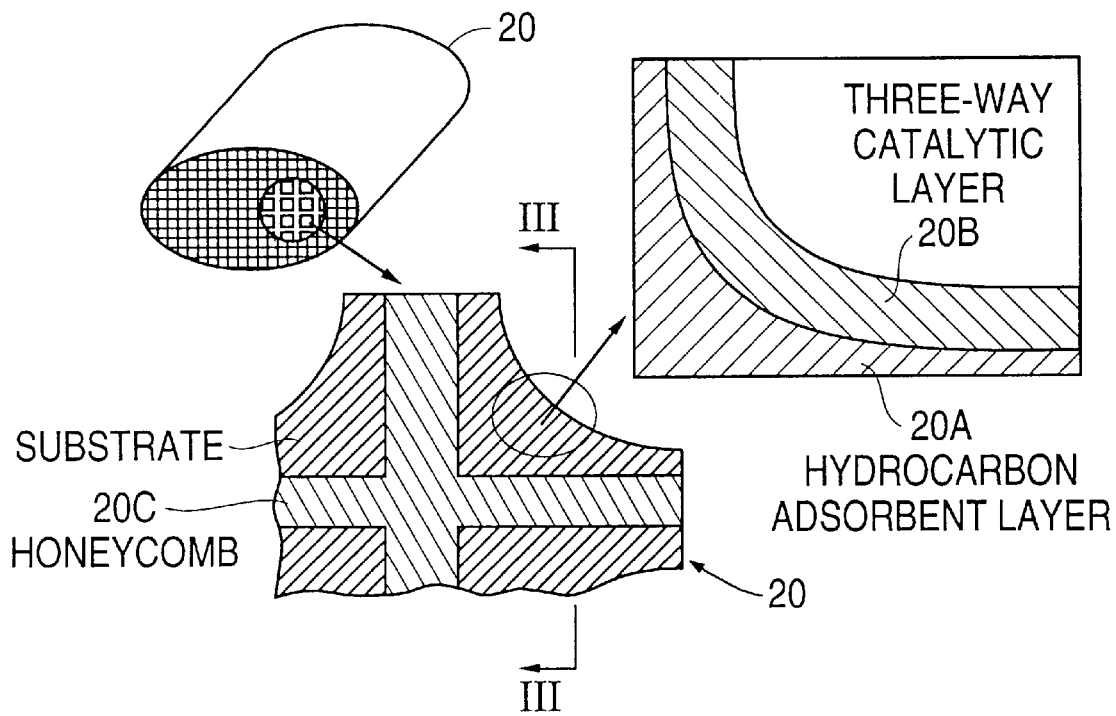
FIG. 2 is a structure of a combined catalytic-hydrocarbon adsorbent for treatment of the exhaust gas.

FIG. 2 shows a structure of the combined catalytic-hydrocarbon adsorbent 20. A hydrocarbon adsorbent layer 20A (hydrocarbon adsorbent) consists of zeolite for an inside layer and a three-way catalytic layer 20B (catalytic converter) carrying precious metal for a surface layer are layered on a cordierite honeycomb (cellular) substrate 20C. This honeycomb (cellular) substrate 20C is provided with catalytic supports widely used in the vehicle industry.

The hydrocarbon adsorbent layer 20A has the capability to adsorb hydrocarbons at a lower temperature such as the start-up period of the engine, and to desorb hydrocarbons at a higher temperature.

The three-way catalytic layer 20B has the capability to oxidize hydrocarbons (HC) and carbon monoxide (CO), and reduce nitrogen oxides (NOx) at the same time under at stoichiometric air fuel ratio.

Figure 3A:
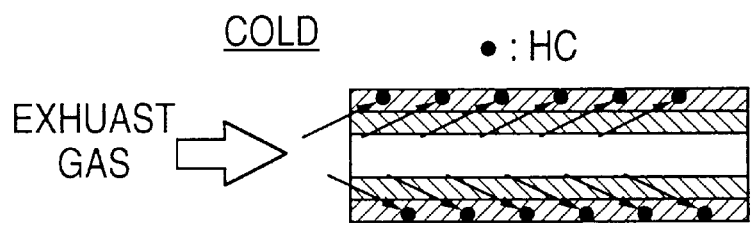
FIG. 3A is a fragmentary sectional view taken on III—III of FIG. 2, illustrating a function of the combined catalytic-hydrocarbon adsorbent at a lower temperature.

As illustrated in FIG. 3A, at a lower temperature situation (cold), the hydrocarbon adsorbent layer 20A adsorbs hydrocarbons in the exhaust gas which passed the three-way catalytic layer 20B.

Figure 3B:
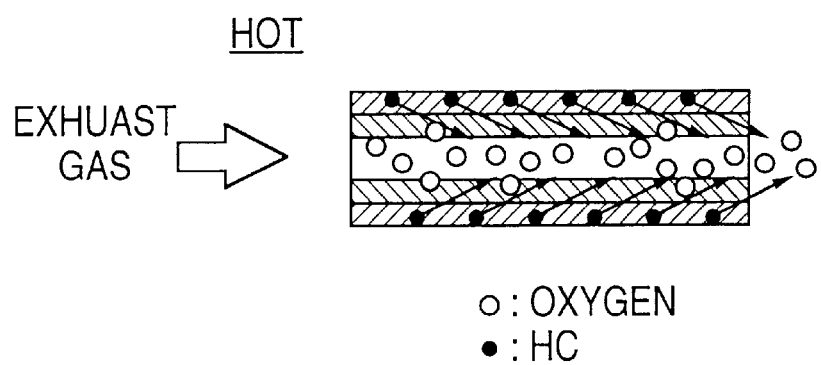
FIG. 3B is a fragmentary sectional view taken on III—III of FIG. 2, illustrating a function of the combined catalytic-hydrocarbon adsorbent at a higher temperature.

As illustrated in FIG. 3B, at a higher temperature situation (hot), the three-way catalytic layer 20B purifies hydrocarbons desorbed from the hydrocarbon adsorbent layer 20A. When desorbed hydrocarbons pass through the three-way catalytic layer 20B, hydrocarbons are oxidized with the oxygen taken from the exhaust.

Here, during the start-up period of the engine at a lower temperature, the engine may maintain steady state by controlling the air fuel mixture to be rich.

However, even if the air fuel mixture is controlled to be rich, a rise of the exhaust gas temperature is not immediately obtained. Therefore activation of the three-way catalytic converter (the three-way catalytic layer 20B) is not expected in this period.

On the other hand, when desorbing hydrocarbons, the air fuel mixture is controlled to be lean relative to stoichiometric so that the air fuel mixture inside the combined catalytic-hydrocarbon adsorbent 20 is stoichiometric which is desirable for effective operation.

Therefore, the rapid rise of the exhaust gas temperature is not obtained in this period, and rapid activation of the three-way catalytic converter (the three-way catalytic layer 20B) is not expected either.

Generally, the desorbing temperature of the hydrocarbon adsorbent is lower than the activation temperature of the three-way catalytic converter.

Therefore, the period from reaching the desorbing temperature of the hydrocarbon adsorbent (the hydrocarbon adsorbent layer 20A) to reaching the activation temperature of the three-way catalytic converter (the three-way catalytic layer 20B) becomes long, and the three-way catalytic converter might not purify the hydrocarbons desorbed from the hydrocarbon adsorbent. With such a result, the amount of hydrocarbons discharged to atmosphere might increase.

Moreover, if the air fuel ratio is controlled to be rich excessively to raise the temperature of the exhaust gas, the amount of hydrocarbons discharged from the engine may increase, i.e., the amount of hydrocarbons discharged to atmosphere might increase.

This exhaust emission control apparatus having the following method of operation, can decrease hydrocarbons discharged to atmosphere after the start of the engine until the activation of the catalytic converter.

If the ignition timing is retarded, and/or the rotation of the engine is increased, the temperature of the exhaust gas can be effectively raised. When the engine runs in a low load region or an idling region, even if the ignition timing is retarded, or the rotation speed is increased, the increase of the amount of hydrocarbons discharged from the engine is small because the volume of the exhaust gas is small originally in such a region.

Thus, in this exhaust emission control apparatus, the air fuel ratio is not controlled to be excessively rich so as not to increase the amount of hydrocarbons discharged to the atmosphere.

In other words, essentially, this exhaust emission control apparatus retards the ignition timing, and/or increases the rotation of the engine at the specific region which is the low load region after the hydrocarbon adsorbent layer 20A (hydrocarbon adsorbent) begins desorbing hydrocarbons until the three-way catalytic layer 20B (catalytic converter) activates.

By this method of operation, the exhaust temperature rises effectively and rapidly, and the three-way catalytic layer 20B is activated rapidly, and the increase of the amount of hydrocarbons is controlled to be minimum.

Therefore, the period from reaching the desorbing temperature of the hydrocarbon adsorbent layer 20A to reaching the activation temperature of the three-way catalytic layer 20B becomes short, and the amount of hydrocarbons discharged to atmosphere may be decreased effectively.

The detail of the exhaust emission control apparatus performed by the control unit 50 will now be described with reference to flowcharts. The procedure performed below can be implemented in hardware, software, or a combination of both.

Figure 4:
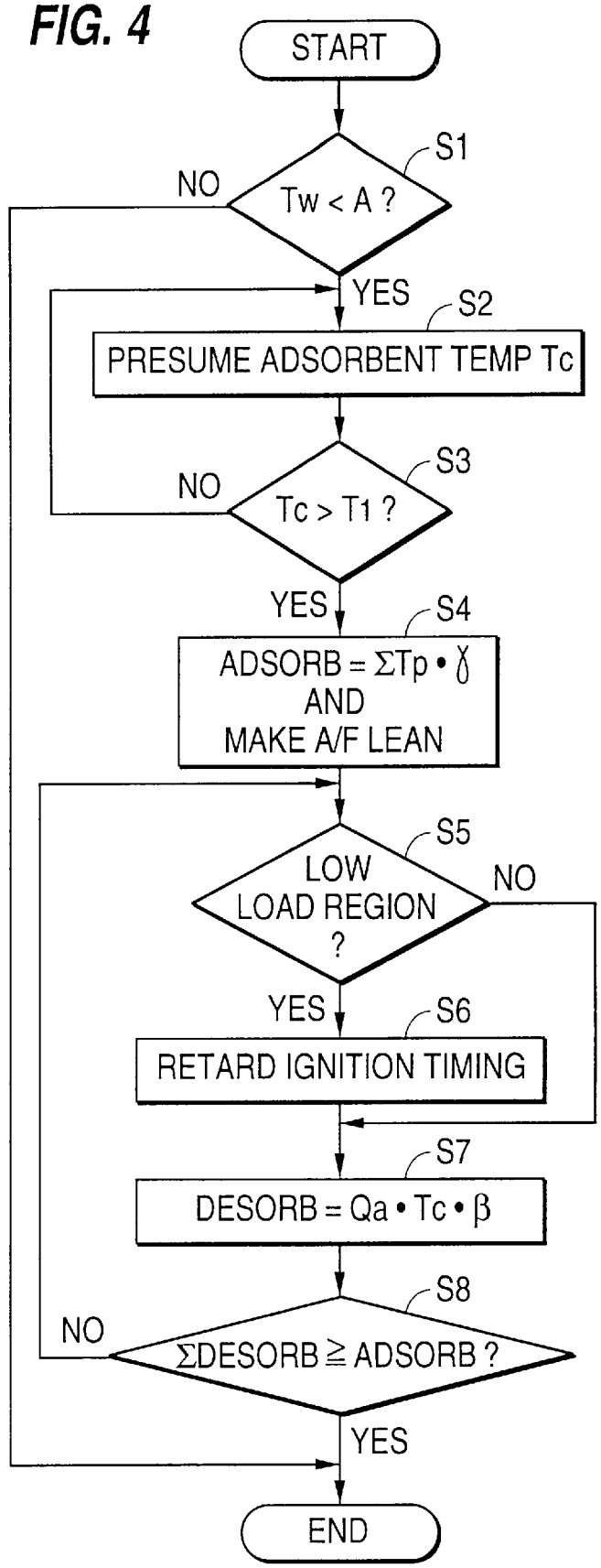
FIG. 4 is a flowchart for describing an exhaust emission control of a preferred embodiment of this invention.

The flowchart of FIG. 4 shows a process for controlling the exhaust gas temperature when the combined catalytic-hydrocarbon adsorbent 20 desorbs hydrocarbons. The procedure in this flowchart can be carried out even if there is no temperature sensor 25, and the cost of the temperature sensor can be eliminated.

When the engine 11 is started, first, in a step S1, the engine cooling water (engine coolant) temperature Tw detected by the water temperature sensor 16 is compared with a predetermined value A.

When the engine cooling water temperature Tw is equal to or greater than the predetermined value A, the hydrocarbon adsorbent layer 20A has already finished desorbing hydrocarbons, and the three-way catalytic layer 20B has already activated. Therefore, the routine proceeds to the END, and the air fuel mixture is controlled to be stoichiometric.

On the other hand, when Tw<A, it is the start-up period of the engine 11, at a lower temperature, and therefore the routine proceeds to a step S2.

In the step S2, the adsorbent temperature Tc is presumed based on the summed amount of the basic injection pulse width Tp and the summed amount of the intake amount Qa. The summed amount of the basic injection pulse width Tp and the summed amount of the intake amount Qa are also calculated in this step S2.

The heat given to the combined catalytic-hydrocarbon adsorbent 20 can be calculated based on the summed amount of the basic injection pulse width Tp, because the heat generated by combustion is transferred to the combined catalytic-hydrocarbon adsorbent 20 through the exhaust gas. The heat taken out by exhaust gas from the combined catalytic-hydrocarbon adsorbent 20 can be calculated based on the exhaust flowing quantity corresponding to the summed amount of the intake amount Qa. Therefore, the present adsorbent temperature Tc can be presumed based on the heat given to the combined catalytic-hydrocarbon adsorbent 20 and the heat taken out from the combined catalytic-hydrocarbon adsorbent 20. Additionally, if the water temperature Tw and/or the atmosphere temperature arc/is considered, the accuracy of the presumed adsorbent temperature Tc will be more improved.

Instead of using the summed basic injection pulse width Tp and the summed intake amount Qa, the adsorbent temperature Tc can be presumed based on a weighted average of the basic injection pulse width Tp and a weighted average of the intake amount Qa.

As other methods of presuming the temperature of the adsorbent Tc, an equilibrium temperature of the adsorbent can be presumed based on the basic injection pulse width Tp and the engine rotation speed Ne. The present adsorbent temperature Tc can be presumed based on this presumed equilibrium temperature of the adsorbent and the continuance period of that running condition.

Here, instead of presuming the adsorbent temperature Tc based on the summed amount of the basic injection pulse width Tp and the summed amount of the intake amount Qa, it is also possible to detect the adsorbent temperature Tc directly based on the signal from the temperature sensor 25, if provided.

In a step S3, it is determined whether or not the adsorbent temperature Tc is greater than a predetermined value T1. The predetermined value T1 is the beginning temperature at which the combined catalytic-hydrocarbon adsorbent 20 desorbs the hydrocarbons.

When Tc>T1, the combined catalytic-hydrocarbon adsorbent 20 begins to desorb hydrocarbons. Therefore, the routine proceeds to a step S4, and the control unit 50 controls the air fuel ratio so that the air fuel ratio at the entrance side of the combined catalytic-hydrocarbon adsorbent 20 may become lean according to the amount of hydrocarbons desorbed from the combined catalytic-hydrocarbon adsorbent 20. With this result, as shown in FIG. 3B, in the three-way catalytic layer 20B, oxygen taken from the exhaust gas can be secured to oxidize the hydrocarbons desorbed from the hydrocarbon adsorbent layer 20A.

On the other hand, when the adsorbent temperature Tc is not greater than the predetermined value T1, the routine returns to the step S2, and it is continued to presume adsorbent temperature Tc in the step S2.

When the combined catalytic-hydrocarbon adsorbent 20 begins to desorb hydrocarbons, in a step S4, the amount of hydrocarbons adsorbed in the combined catalytic-hydrocarbon adsorbent 20 is presumed. This amount of hydrocarbons adsorbed in the combined catalytic-hydrocarbon adsorbent 20 is presumed by the following equation (7).

$$ADSORB = \Sigma Tp \cdot \gamma \qquad (7)$$

where,
ADSORB=the amount of hydrocarbons adsorbed in the combined catalytic-hydrocarbon adsorbent 20, from the start of the engine,
$\Sigma Tp$=the summed amount of the basic injection pulse width Tp from the start of the engine,
$\gamma$=adsorption efficiency coefficient.

Adsorption efficiency changes depending on the temperature of the combined catalytic-hydrocarbon adsorbent 20. Therefore, it is preferable to calculate the ADSORB referring to the adsorption efficiency coefficient corresponding to the adsorbent temperature Tc from a map.

In a step S5, it is determined whether or not the engine running condition is in the idling region or the low load region based on the throttle valve opening signal from the throttle sensor 22 and the rotation of the engine from the crank angle sensor 24. In other words, in step S5, it is determined whether or not the engine running condition is in the region where the intake air amount or exhaust gas volume is small.

When the engine running condition is in the idling region or the low load region, the routine proceeds to a step S6. The other hand, when the engine running condition is not in the idling region or the low load region, the routine skips step S6 and proceeds to a step S7.

In the step S6, the ignition timing is retarded a predetermined amount as compared to the usual ignition timing. At this time, the amount of hydrocarbons discharged from the engine 11 is controlled to be minimum, and it is possible to raise the temperature of exhaust gas effectively, because the running condition of the engine is in the idling region or the low load region.

Figure 5:
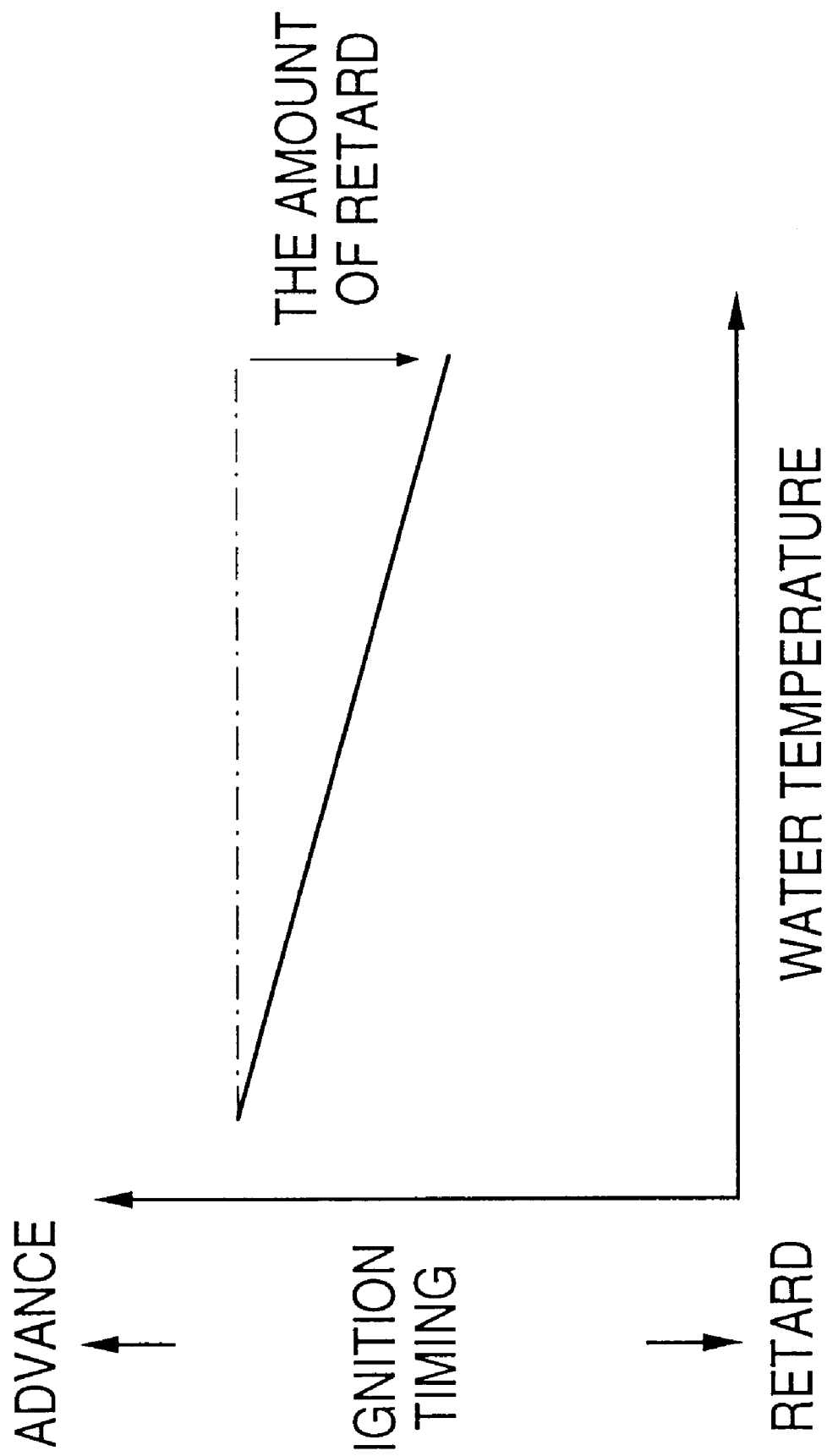
FIG. 5 is a diagram for describing an ignition timing-water temperature characteristic.

As shown in FIG. 5, it is preferable to decide the retarded amount of the ignition timing according to the engine cooling water temperature Tw detected by the water temperature sensor 16. Responding to the rise of the water temperature Tw, the combustion of the engine becomes more stable. Therefore, the retard amount of the ignition timing can be enlarged within the range where the stability of the combustion of the engine is maintained, and it is possible to raise the exhaust gas temperature effectively.

When the engine running condition is not in the idling region or the low load region, in the step S5, the exhaust gas volume might be large, therefore the retarding of the ignition timing, such as in the step S6, is not carried out. In other words, the ignition timing is not retarded in the region other than the idling region or the low load region, because the amount of hydrocarbons discharged from the engine might increase.

In a step S7, the amount of hydrocarbons desorbed from the combined catalytic-hydrocarbon adsorbent 20 is presumed. The amount of hydrocarbons desorbed from the combined catalytic-hydrocarbon adsorbent 20 at this time is presumed by the following equation (8).

$$DESORB = Qa \cdot Tc \cdot \beta \qquad (8)$$

where,
DESORB=the amount of hydrocarbons [g] desorbed from the combined catalytic-hydrocarbon adsorbent 20,
Qa=the intake air flow rate [g /sec],
Tc=the adsorbent temperature,
$\beta$=conversion coefficient for hydrocarbon desorbtion amount.

The density of hydrocarbons [%] desorbed from the combined catalytic-hydrocarbon adsorbent 20 correlates to the temperature of the combined catalytic-hydrocarbon adsorbent 20. Therefore, $Tc \cdot \beta$ indicates the amount of hydrocarbons desorbed from the combined catalytic-hydrocarbon adsorbent 20 corresponding to the temperature of the combined catalytic-hydrocarbon adsorbent 20. In addition, the amount of the intake air Qa is multiplied, therefore the amount of the hydrocarbons DESORB [g] at this time can be calculated.

The gross weight of the amount of hydrocarbons desorbed from the combined catalytic-hydrocarbon adsorbent 20 can be presumed by summing DESORB every processing loop cycle.

In a step S8, the summed amount of DESORB calculated in the step S7 is compared with the amount of ADSORB calculated in the step S4.

When the summed amount of DESORB is equal to or greater than the amount of ADSORB, the desorbtion of the hydrocarbons has already finished, and the routine proceeds to the END, and air fuel mixture is controlled to be stoichiometric.

On the other hand, when the summed amount of DESORB is smaller than the amount of ADSORB, the routine returns to the step S5 because the desorbtion of the hydrocarbons still continues. As engine running continues in the idling region or low load region, the ignition timing is retarded continually.

Figure 6:
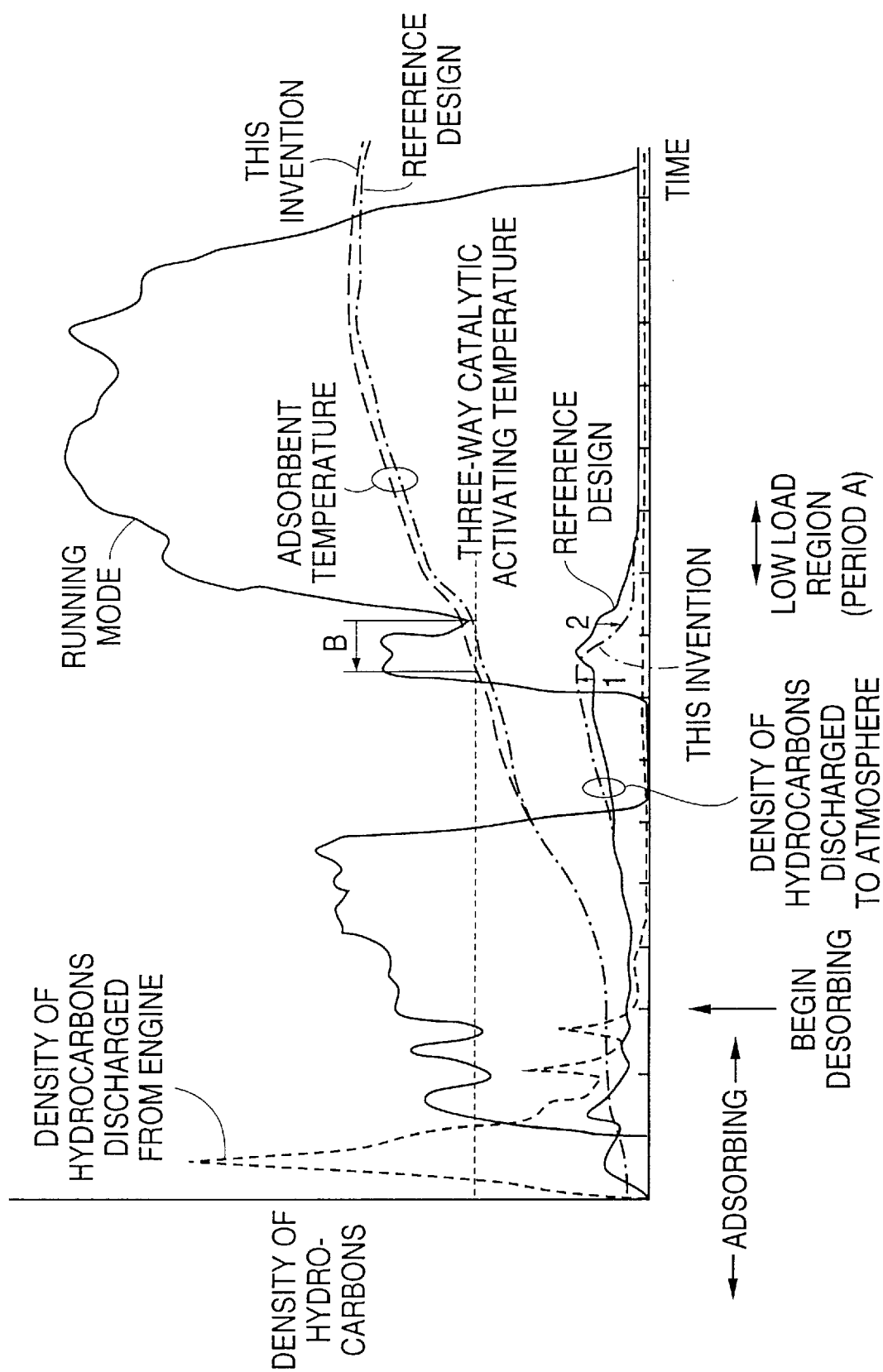
FIG. 6 is a characteristic of the density of hydrocarbons discharged from the engine, the density of hydrocarbons discharged to the atmosphere, and adsorbent temperature Tc, obtained by experiment.

FIG. 6 is a characteristic of the density of hydrocarbons discharged from the engine, the density of hydrocarbons discharged to the atmosphere, and the adsorbent temperature Tc, obtained by experiment.

Referring to FIG. 6, the running mode of the vehicle corresponding to the engine load is illustrated by a solid line. Period A shows that the engine is in the low road region such as the idling region.

The adsorbent temperature of this invention is compared with a reference design. From this comparison of the three-way catalytic activating temperature, according to this invention, the three-way catalytic layer 20B of the combined catalytic hydrocarbon adsorbent 20 activates early, as shown by time period B.

A short dashed line shows a density of the hydrocarbons discharged from the engine. It is a result of a measurement on the upstream side of the three-way catalytic converter 19, and indicates that a lot of hydrocarbons are discharged from the engine during the start-up period of the engine at a lower temperature.

The densities of the hydrocarbons discharged to the atmosphere, through the three-way catalytic converter 19 and combined catalytic hydrocarbon adsorbent 20, for this invention and for the reference design are compared. Here, this reference design indicates the case wherein the ignition timing is not retarded in the idling region or the low load region like the embodiment of this invention.

During the start-up period of the engine, the combined catalytic-hydrocarbon adsorbent 20 adsorbs hydrocarbons, therefore the amount of the hydrocarbons discharged to the atmosphere is greatly reduced.

Comparing this invention and the reference design, the discharging characteristic of the hydrocarbons is the same in the start-up period of the engine. However, during the low load region (period A), and immediately after this low load region, the discharging characteristic of the hydrocarbons is different.

When the running condition of the engine is in the idling region or the low load region after reaching the desorbing temperature of the hydrocarbon adsorbent, ignition timing is retarded. Thus, the temperature of the exhaust gas rises effectively, and the temperature of the combined catalytic-hydrocarbon adsorbent 20 rises rapidly compared with a reference design, even though the density of hydrocarbons discharged to the atmosphere slightly increases (arrow 1).

Therefore, when the running condition of the engine changes to a high load region, the density of hydrocarbons discharged to the atmosphere decreases (arrow 2).

Figure 7:
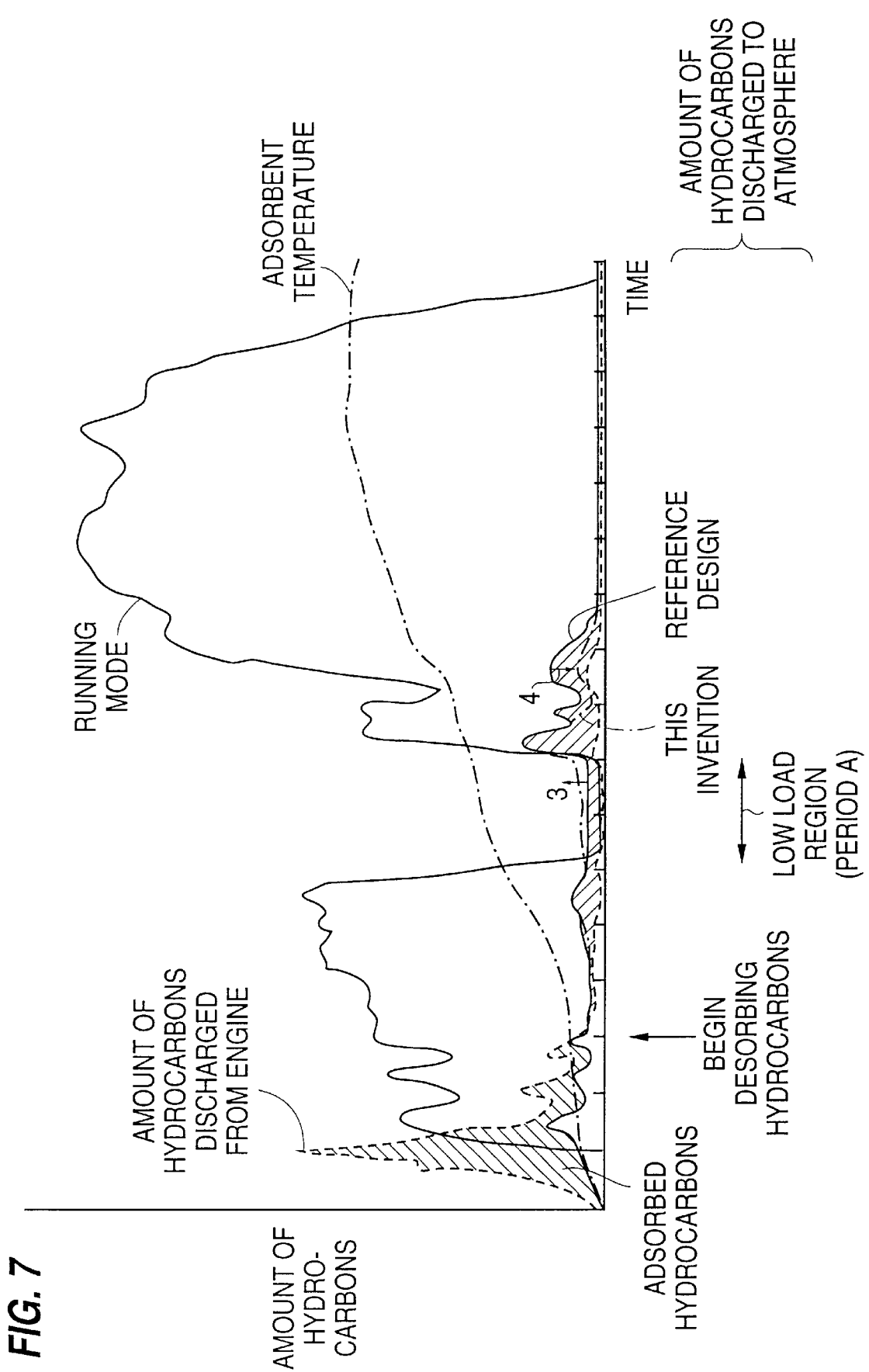
FIG. 7 is a characteristic of the amount of hydrocarbons discharged from the engine, and the amount of hydrocarbons discharged to the atmosphere, obtained by experiment, for illustrating that the amount of hydrocarbons discharged to the atmosphere decreases effectively by a preferred embodiment of this invention.

FIG. 7 is a characteristic of the amount of hydrocarbons discharged to the atmosphere, obtained by experiment, illustrating that the amount of hydrocarbons discharged to atmosphere decreases effectively by this preferred embodiment of this invention. As in FIG. 6, a solid line illustrates the running mode of the vehicle corresponding to the engine load, and a short dashed line illustrates an amount of the hydrocarbons discharged from the engine.

Referring to FIG. 7, during the start-up period of the engine, the combined catalytic-hydrocarbon adsorbent 20 adsorbs hydrocarbons. Hatching shows the amount of the hydrocarbons adsorbed in the combined catalyst-hydrocarbon adsorbent 20. Therefore, the amount of the hydrocarbons discharged to the atmosphere is greatly reduced in this period.

After reaching the desorbing temperature of the hydrocarbon adsorbent, the combined catalyst-hydrocarbon adsorbent 20 begins desorbing hydrocarbons. Hatching shows the amount of the hydrocarbons desorbed from the combined catalyst-hydrocarbon adsorbent 20.

Even though the ignition timing is retarded like this invention, when the engine is running in the low load region (period A), the increase of the amount of hydrocarbons discharged to the atmosphere is slight (arrow 3). In other words, as the volume of the exhaust gas is small originally in the low load region, even though retarding the ignition timing increases hydrocarbons, the increasing amount of hydrocarbons is slight.

However, when the running condition of the engine changes to the high load region, the three-way catalytic layer 20B has already activated, therefore the increase of the amount of hydrocarbons discharged to atmosphere is greatly decreased (arrow 4).

The overall result is that the amount of hydrocarbons discharged to the atmosphere is greatly reduced compared with the reference design.

Another preferred embodiment of this invention will now be described with accompanying drawings. The basic composition is the same as FIG. 1.

This other embodiment, essentially, increases the engine rotation in the low load region or the idling region, after the hydrocarbon adsorbent layer 20A (hydrocarbon adsorbent) begins desorbing hydrocarbons until three-way catalytic layer 20B (catalytic converter) activates.

Figure 8:
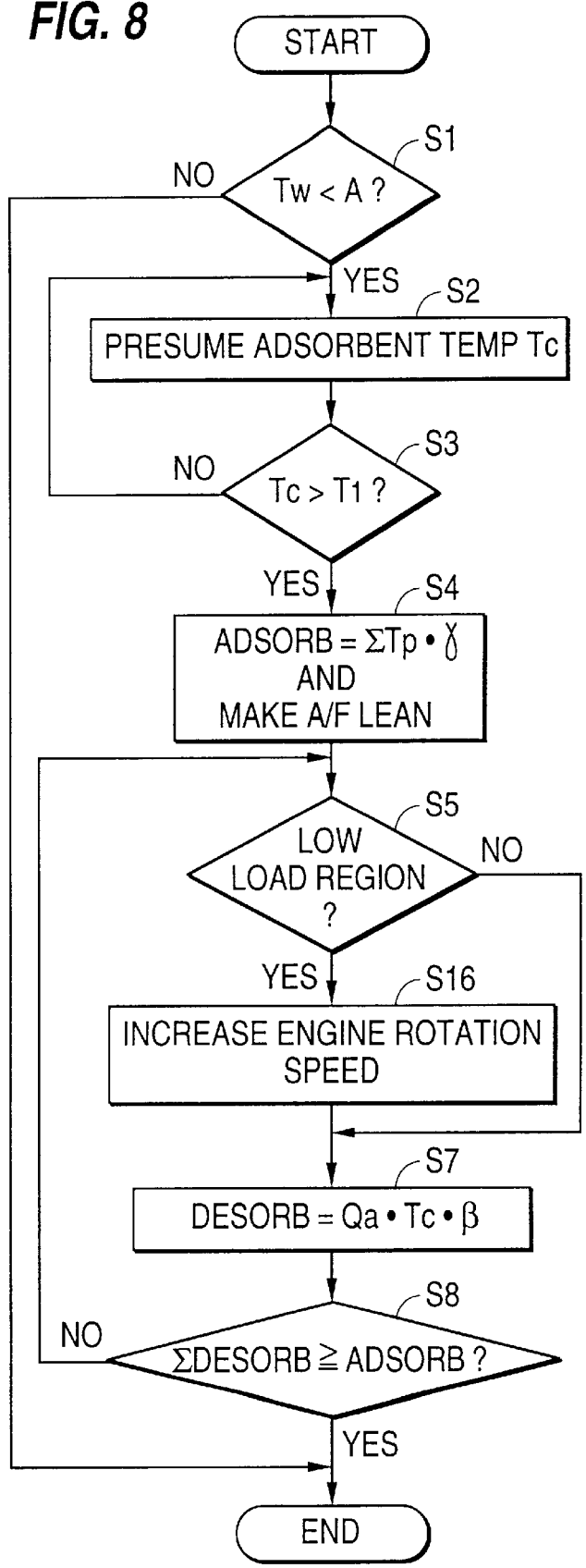
FIG. 8 is a flowchart for describing an exhaust emission control of another preferred embodiment of this invention.

Referring to FIG. 8, a step 16 is different from the flowchart of FIG. 4. The other steps are the same as the flowchart of FIG. 4. Therefore, the other steps quote the same number as FIG. 4, and the explanation is not repeated.

In a step S5, if the engine running condition is in the idling region or the low load region, the routine proceeds to step S16. The other hand, when the engine running condition is not in the idling region or the low load region, the routine skips step S16 and proceeds to step S7.

In the step S16, the engine rotation is increased a predetermined amount as compared to the usual engine rotation. Changing an opening degree of the throttle valve 31 can increase the engine rotation. This throttle valve 31 is driven according to a driving signal from the control unit 50. It is also possible to change an opening degree of the supplementary air valve 36 instead of changing the opening degree of the throttle valve 31.

With this design, the three-way catalytic layer 20B can be activated early by increasing the engine rotation to increase exhaust gas temperature, and even though the rotation speed is increased, the increase of the amount of hydrocarbons discharged from the engine is small because the volume of the exhaust gas is small originally.

When the engine running condition is not in the idling region or the low load region, in the step S5, the exhaust gas volume might be large, therefore the increase of the engine rotation such as in the step S16 is not carried out. The engine rotation is not increased in a region other than the idling region or the low load region, because the amount of hydrocarbons discharged from the engine might increase.

While engine-running condition is still in the idling region or the low load region, the engine rotation is continually increased until the desorbtion of the hydrocarbons has finished.

By this method of operation, the exhaust temperature rises effectively, and the three-way catalytic converter (three-way catalytic layer 20B) is activated rapidly with the increase of the amount of hydrocarbons controlled to be minimum.

Therefore, the period from reaching the desorbing temperature of the hydrocarbon adsorbent (hydrocarbon adsorbent layer 20A) to reaching the activation temperature of the catalytic converter (three-way catalytic layer 20B) becomes short, and the amount of hydrocarbons discharged to atmosphere may be decreased effectively.

Another preferred embodiment by this invention will now be described with accompanying drawings. The basic composition is the same as FIG. 1.

This other embodiment, essentially, retards the ignition timing and closes the swirl control valve 37 at the specific region which is the low load region such as the idling region, after the hydrocarbon adsorbent layer 20A (hydrocarbon adsorbent) begins desorbing hydrocarbon until three-way catalytic layer 20B (catalytic converter) activates.

Figure 9:
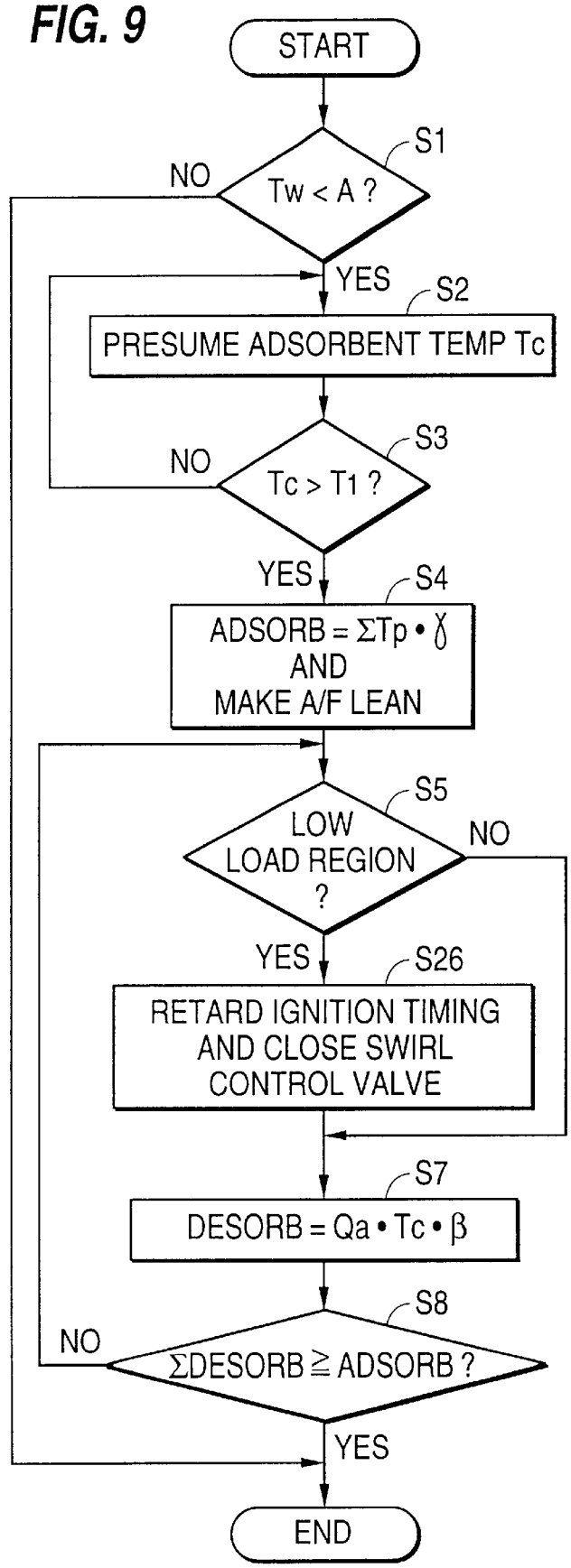
FIG. 9 is a flowchart for describing an exhaust emission control of another preferred embodiment of this invention.

Referring to FIG. 9, a step 26 is different from the flowchart of FIG. 4. The other steps are the same as the flowchart of FIG. 4. Therefore, the other steps quote the same numbers as FIG. 4, and explanation is not repeated.

In a step S5, if the engine running condition is in the idling region or the low load region, the routine proceeds to step S26. The other hand, when the engine running condition is not in the idling region or the low load region, the routine skips step S26 and proceeds to step S7.

In step S26, the ignition timing is retarded a predetermined amount as compared to the usual ignition time, and at the same time the swirl control valve 37 is closed.

When the engine running condition is not in the idling region or the low load region, in the step S5, the exhaust gas volume might be large, therefore the retarding of the ignition timing and closing the swirl control valve 37, as in the step S26, is not carried out. And ignition timing is not retarded and the swirl control valve is not closed in the region other than the idling region or the low load region, because the amount of hydrocarbons discharged from the engine might increase.

While the engine running condition is still in the idling region or low load region, the ignition timing is continually retarded, and the swirl control valve 37 is continually closed until the desorbtion of the hydrocarbons has finished.

By this method of operation, explained previously, the amount of hydrocarbons discharged from the engine is controlled to be minimum, and it is possible to raise the temperature of the exhaust gas effectively and rapidly, because the running condition of the engine is in the idling region or the low load region.

Moreover, swirl flow in the combustion chamber is reinforced when the swirl control valve 37 is closed, and improvement of combustion is obtained. Responding to improvement of combustion, the amount of hydrocarbons discharged from the engine is decreased, and the retard amount of the ignition timing can be enlarged. Therefore it is possible to raise the exhaust gas temperature effectively because the retard amount of the ignition timing can be enlarged within the range where the stability of the combustion of the engine is maintained.

As shown in FIG. 5, it is also preferable to decide the retard amount of the ignition timing according to the engine cooling water temperature Tw detected by the water temperature sensor 16. When the engine cooling water temperature Tw increases, the stability of the combustion of the engine is increases, and the retard amount of the ignition timing can be more enlarged.

In this embodiment, the swirl control valve 37 is installed in the intake manifold 28 as an intake air control valve. Instead of using the swirl control valve 37, a tumble flow control valve, which creates a tumble flow in the combustion chamber 30, can be installed in the intake manifold 28.

It is also possible to control the fuel pressure or fuel injection timing as a way to improve combustion instead of closing the swirl control valve 37.

Another preferred embodiment of this invention will now be described with accompanying drawings.

Figure 10:
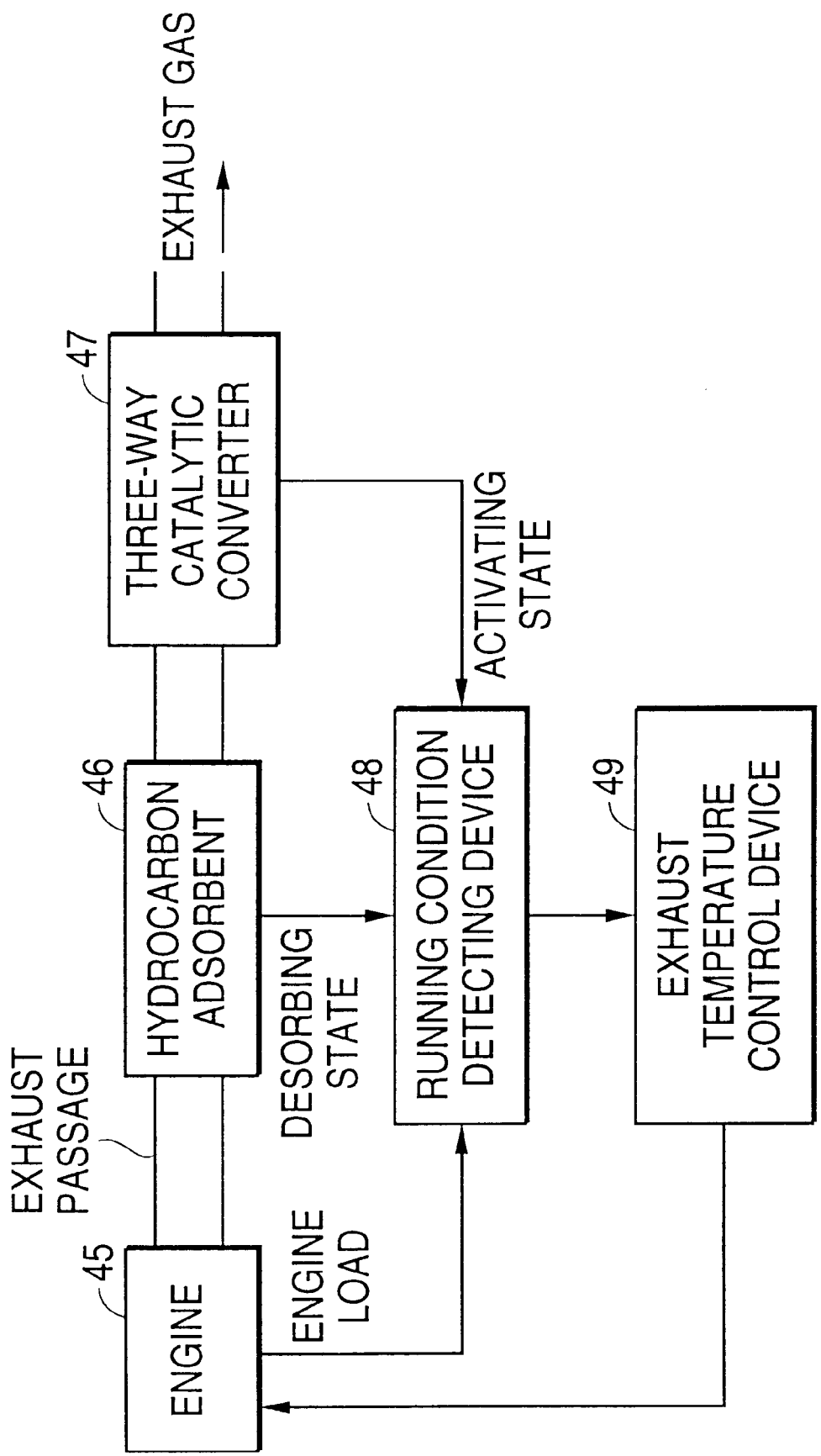
FIG. 10 is a schematic diagram of an exhaust emission control apparatus of another preferred embodiment of this invention.

FIG. 10 indicates an exhaust emission control apparatus of a multi-cylinder internal combustion engine 45 for a vehicle. The exhaust gas due to combustion is discharged into the atmosphere through a hydrocarbon adsorbent 46, and a three-way catalytic converter 47 via an exhaust passage.

Engine running condition including the engine load, hydrocarbon desorbing state of the hydrocarbon adsorbent 46, and the activating state of three-way catalytic converter 47 are input to a running condition detecting device 48. The running condition detecting device 48 decides whether or not to operate an exhaust temperature control device 49.

When the engine condition is in the low load region or the idling region, after the hydrocarbon adsorbent 46 begins to desorb hydrocarbons until the three-way catalytic converter activates, the running condition detecting device 48 operates the exhaust temperature control device 49. At this time the exhaust temperature control device 49 controls the engine 45 so that the temperature of the exhaust gas is raised. In detail, the temperature of the exhaust gas is raised by, for example, retarding the ignition timing and/or increasing the engine rotation.

A modification of the FIG. 1 alignment will now be described with accompanying drawings.

Figure 11:
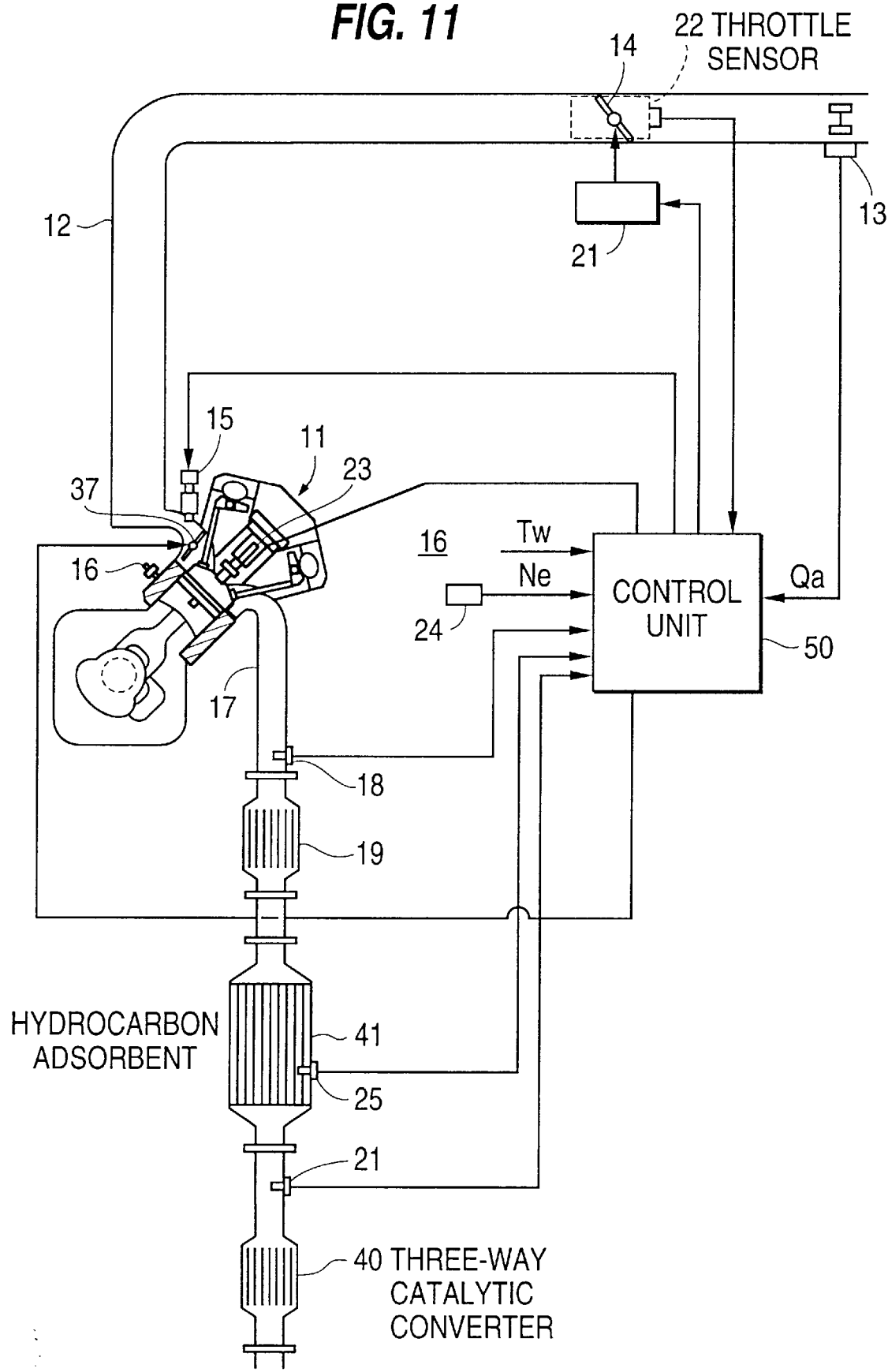
FIG. 11 is a schematic diagram of an exhaust emission control apparatus of another preferred embodiment of this invention.

As shown FIG. 11, it is also possible to install a three-way catalytic converter 40 downstream of the hydrocarbon adsorbent 41, instead of using the combined catalytic-hydrocarbon adsorbent. In this case, the three-way catalytic converter 40 purifies hydrocarbons desorbed from hydrocarbon adsorbent 41.

Although the invention has been described in its present preferred form with a certain degree of particularity, it is understood that the spirit and the scope of the invention is not limited to the embodiments described above.

What is claimed is:

1. An exhaust emission control apparatus for a combustion engine, comprising:
   a hydrocarbon adsorbent for adsorbing hydrocarbons at a lower temperature, and desorbing hydrocarbons at a higher temperature, disposed in an exhaust passage of an engine;
   a catalytic converter for purifying hydrocarbons desorbed from said hydrocarbon adsorbent, disposed in said exhaust passage of said engine;
   a sensor to detect an engine low load region;
   a processor to determine when said hydrocarbon adsorbent begins to desorb hydrocarbons; and
   an engine exhaust temperature control device to raise an exhaust temperature discharged from the engine itself when said hydrocarbon adsorbent begins to desorb hydrocarbons in a low load region, wherein said engine exhaust temperature control device raises said exhaust temperature when said hydrocarbon adsorbent desorbs hydrocarbons before said catalytic converter has activated in the low load region.

2. An exhaust emission control apparatus for a combustion engine as defined in claim 1, wherein said processor determines whether or not said hydrocarbon adsorbent begins desorbing hydrocarbons based on an adsorbent temperature.

3. An exhaust emission control apparatus for a combustion engine as defined in claim 2, wherein said processor presumes said adsorbent temperature based on a fuel injection amount.

4. An exhaust emission control apparatus for a combustion engine as defined in claim 2, wherein said engine processor presumes said adsorbent temperature based on an intake air amount.

5. An exhaust emission control apparatus for a combustion engine as defined in claim 2, wherein said processor presumes whether or not said hydrocarbon adsorbent has finished desorbing hydrocarbons; and said engine exhaust temperature control device raises exhaust temperature when said hydrocarbon adsorbent begins desorbing hydrocarbons until said hydrocarbon adsorbent finishes desorbing hydrocarbons.

6. An exhaust emission control apparatus for a combustion engine as defined in claim 1, wherein said processor determines whether or not said catalytic converter has activated based on a temperature of engine coolant.

7. An exhaust emission control apparatus for a combustion engine as defined in claim 1, wherein said low load region is an idling region.

8. An exhaust emission control apparatus for a combustion engine as defined in claim 1, wherein said engine exhaust temperature control device retards ignition timing of said engine.

9. An exhaust emission control apparatus for a combustion engine as defined in claim 8, wherein said engine exhaust temperature control device retards ignition timing of said engine corresponding to a temperature of engine coolant.

10. An exhaust emission control apparatus for a combustion engine as defined in claim 1, wherein said engine exhaust temperature control device increases engine rotation.

11. An exhaust emission control apparatus for a combustion engine as defined in claim 1, wherein said hydrocarbon adsorbent and said catalytic converter are combined as a combined catalytic-hydrocarbon adsorbent.

12. An exhaust emission control apparatus for a combustion engine as defined in claim 1, wherein said catalytic converter is disposed downstream of said hydrocarbon adsorbent.

13. An exhaust emission control apparatus for a combustion engine, comprising:

a hydrocarbon adsorbent for adsorbing hydrocarbons at a lower temperature, and desorbing hydrocarbons at a higher temperature, disposed in an exhaust passage of an engine;

a catalytic converter for purifying hydrocarbons desorbed from said hydrocarbon adsorbent, disposed in said exhaust passage of said engine;

a sensor to detect an engine low load region;

a processor to determine when said hydrocarbon adsorbent begins to desorb hydrocarbons;

an engine exhaust temperature control device to raise an exhaust temperature discharged from the engine itself when said hydrocarbon adsorbent begins to desorb hydrocarbons in a low load region wherein said engine exhaust temperature control device retards ignition timing of said engine; and an intake air control valve for making a flow in a combustion chamber, when the ignition timing is retarded.

* * * * *